UNITED STATES PATENT OFFICE.

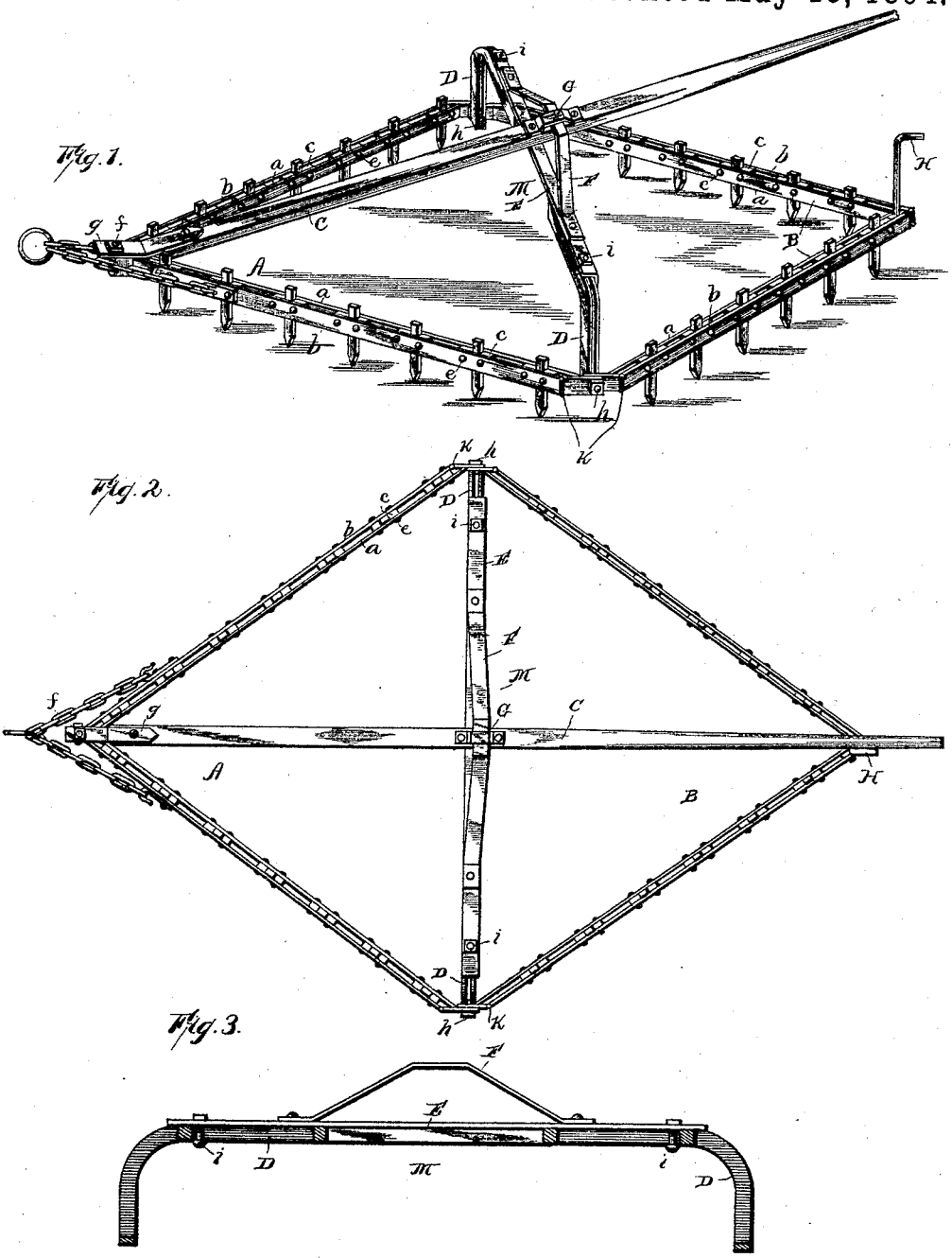

JOHN C. JOHNSON, OF DALLAS, TEXAS, ASSIGNOR OF ONE-HALF TO J. W. HAMPTON, OF SAME PLACE.

HARROW.

SPECIFICATION forming part of Letters Patent No. 519,767, dated May 15, 1894.

Application filed December 9, 1892. Renewed March 8, 1894. Serial No. 502,920. (No model.)

*To all whom it may concern:*

Be it known that I, JOHN C. JOHNSON, a citizen of the United States, residing at Dallas, in the county of Dallas and State of Texas, have invented certain new and useful Improvements in Harrows; and I do hereby declare the following to be a full, clear, and exact description of the invention, such as will enable others skilled in the art to which it appertains to make and use the same.

My invention has relation to improvements in harrows, and it consists in the peculiar construction, certain novel combinations and the adaptation of parts hereinafter described and particularly pointed out in the claims appended.

In the accompanying drawings:—Figure 1 is a perspective view of my improved harrow. Fig. 2 is a plan view of the same, and Fig. 3 is a sectional view of the extensible truss-bar removed.

Referring by letter to the said drawings:— A and B, respectively indicate the forward and rear tooth bars of my improved harrow, which preferably comprise the parallel plates $a, b$, the washers $c$, resting on either side of the depending teeth $d$, and the bolts or rivets $e$, for fastening the washers and the teeth in position between the said plates $a, b$. The forward ends of the inner plates $a$, of the forward bars A, are preferably extended beyond the forward ends of the plates $b$, and are bent so as to rest parallel and receive between them the depending eye-plate of an eye-bolt $f$. The eye-bolt $f$, as better illustrated in Fig. 2 of the drawings, takes upwardly through the forwardly-extending plate $g$, of the handle bar C, and is secured thereto by a nut, as shown, forming a hinge or pivot for the ends of the bars A. The rear ends of the inner plates $a$, of the rear tooth bars B, are extended beyond the ends of the outer plates $b$, and are connected together by a yielding connection, as illustrated.

As better illustrated in Fig. 2 of the drawings, the rear ends of the outer plates $b$, of the forward tooth bars A, and the forward ends of the outer plates $b$, of the rear tooth bars B, are extended beyond the corresponding ends of the inner plates $a$, and are flexibly connected together by bolts or rivets as $h$, for a purpose presently to be described.

Pivotally or flexibly connected to the bolts or rivets $h$, are the downwardly-curved outer ends of the brackets D, of the truss-bar M, which brackets are provided throughout their length with the vertically-disposed slots as shown for the passage of the adjusting bolts $i$, which take through apertures in the horizontal portion of the angle iron E, which serves to connect the said brackets.

Fixedly connected at its ends to the upper side of the angle iron E, of the truss-bar M, is a bowed bail F, between which and the said angle iron E, passes the handle bar C, which preferably extends beyond the rear end of the harrow, as shown. This handle bar C, which is designed and adapted to lift the forward tooth bars A, off the ground, is connected to the bowed bail F, through the medium of the plate G, which straddles said bail and has its ends connected to the handle bar C, as illustrated.

Pivotally connected to one of the rear tooth bars B, and extending upwardly therefrom, is a rotary shank H, which is provided at its upper end with a hook branch designed and adapted to engage the handle bar C, and hold the forward tooth bars in their raised position.

In the practice of my invention, the clevis for the attachment of the draft animals may be connected to the front tooth bars A, in any approved manner, although I prefer to attach it by chains as illustrated.

By the provision of the forward and rear tooth bars having their contiguous ends flexibly connected, the truss-bar, the handle bar and the hook for engaging said bar it will be readily perceived that when it is desirable the draft may be materially lessened by pushing downwardly upon the rear end of the handle bar C, and turning the hook H, so as to engage the said bar, by reason of which it will be seen that the forward tooth bars A will be lifted from the ground.

By the provision of the tooth bars connected as described, the extensible truss-bar, the bowed bail and the plate connecting said bail to the handle bar, it will be readily perceived that when it is desirable to increase the width of the harrow, it is simply necessary to loosen the bolts $i$, to loosen one of the bolts connecting the plate G, to the bar C, to push the truss-bar M, and its bail F, forwardly and secure them in such position by again fastening the plate G, and finally to extend the brackets D, as far as desired, and secure them in such extended position by tightening the bolts $i$, when it will be seen that the width of the harrow will be increased and the length of the same decreased the relative movement of the bars A and B being made possible by the hinge joints $k$.

When it is desired to decrease the width of the harrow, it is simply necessary, as is obvious, to reverse the operation just described.

From the foregoing description it will be readily perceived that I have provided an exceedingly cheap and simple harrow embodying such a construction that the draft may be readily increased and diminished as well as the width of the harrow.

Although I have specifically described the construction and relative arrangement of the several elements of my improved harrow, yet I do not desire to be confined to the same, as such changes or modifications may be made as fairly fall within the scope of my invention, nor do I desire to be confined to the manner described of connecting the forward ends of the tooth bars A, and the rear ends of the bars B, as they may be otherwise flexibly connected if desirable.

Having thus described my invention, what I claim, and desire to secure by Letters Patent, is—

1. In a harrow, the combination with the yielding frame, of an extensible truss bar consisting of an angle iron and slotted braces adjustably connected thereto and to the opposite angles of the frame, substantially as specified.

2. In a harrow, the combination with the yielding frame, of an extensible truss-bar consisting of an angle iron and slotted braces adjustably connected thereto, a lever connected at one end to the front angle of the frame and fulcrumed above said truss-bar, substantially as and for the purpose specified.

3. In a harrow, the combination with the yielding frame of an extensible truss-bar consisting of an angle iron and slotted braces adjustably connected thereto, and to the opposite angles of the frame, a lever connected at one end to the front angle of the frame and fulcrumed upon a bail supported by the angle bar, and a hook adapted to receive the free end of the lever, substantially as and for the purpose specified.

4. The combination with a yielding frame composed of tooth bars consisting of parallel bars and teeth clamped therebetween, of an extensible truss-bar consisting of an angle iron and slotted braces adjustably connected thereto and to the opposite angles of the frame, a lever connected at one end to the front angle of the frame and fulcrumed upon a bail supported by the angle iron, and a plate upon said lever and straddling said bail, and a hook upon said frame adapted to receive one end of the lever, substantially as and for the purpose specified.

In testimony whereof I affix my signature in presence of two witnesses.

JOHN C. JOHNSON.

Witnesses:
JOHN A. WOOD,
WM. F. LAPE.